No. 632,493. Patented Sept. 5, 1899.
A. KITSON.
VAPOR TUBE CLEANER.
(Application filed Dec. 2, 1898.)
(No Model.)
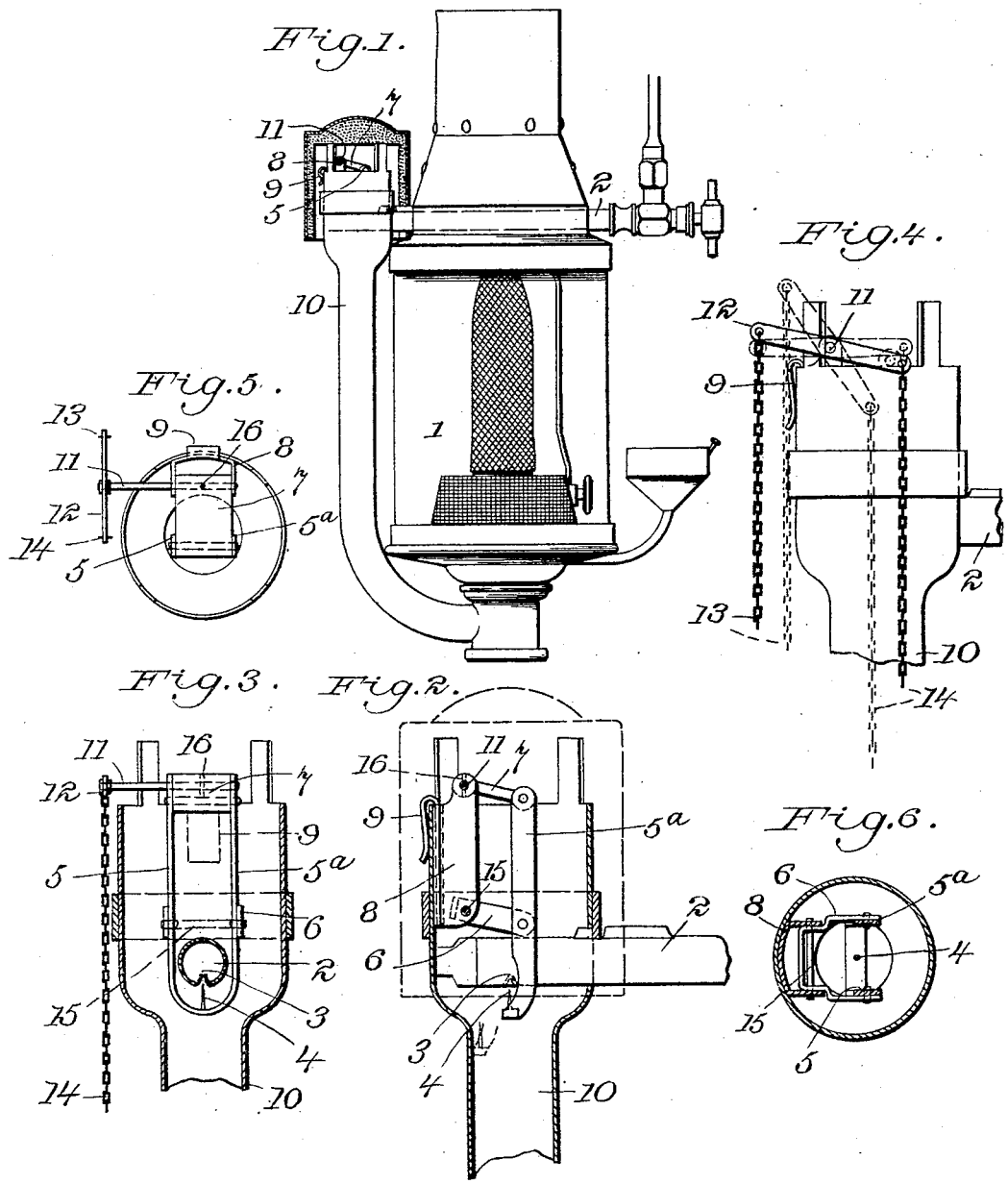
WITNESSES:
INVENTOR
BY
ATTORNEY

UNITED STATES PATENT OFFICE.

ARTHUR KITSON, OF PHILADELPHIA, PENNSYLVANIA, ASSIGNOR TO THE KITSON HYDROCARBON HEATING AND INCANDESCENT LIGHTING COMPANY, OF SAME PLACE AND CHARLESTON, WEST VIRGINIA.

VAPOR-TUBE CLEANER.

SPECIFICATION forming part of Letters Patent No. 632,493, dated September 5, 1899.

Application filed December 2, 1898. Serial No. 698,112. (No model.)

*To all whom it may concern:*

Be it known that I, ARTHUR KITSON, a subject of the Queen of Great Britain, and a resident of Philadelphia, county of Philadelphia, State of Pennsylvania, have invented certain new and useful Improvements in Vapor-Tube Cleaners, of which the following is a specification.

My invention relates to vapor-burning apparatus, and more particularly consists in an improved form of vapor-tube cleaner for keeping the discharge-opening of the vaporizing-tubes used in such apparatus free from carbon and other impurities which tend to collect therein and interfere with the discharge of vapor.

The preferred form of apparatus embodying my invention is shown in the accompanying sheet of drawings, in which—

Figure 1 is a side elevation of a vapor-burning apparatus with the muffler shown in section. Fig. 2 is a central section, enlarged, from Fig. 1. Fig. 3 is a similar central section taken on a plane at right angles to the plane of Fig. 2. Fig. 4 is a detail side elevation similar to Fig. 2, showing the reversing-lever in various positions. Fig. 5 is a plan view of Fig. 3, and Fig. 6 is a section on line 6 6 of Fig. 2 with the vaporizing-tube removed.

Throughout the drawings like reference-figures refer to like parts.

The vapor-burning apparatus is generally represented by the numeral 1. This vapor-burning apparatus may of course be of any desirable form; but I have illustrated that shown and described in my pending application, Serial No. 674,573, filed March 21, 1898.

2 is the vaporizing-tube of such vapor-burning apparatus, which has the discharge-opening 3 preferably made in the form of a punched-up portion of the side wall of said tube, as shown. 4 is a cleaning-needle mounted opposite to said discharge-opening 3 and provided with means for projecting it into said opening and withdrawing it therefrom.

The preferred form of means for moving the needle, as shown, consists of the parallel-motion mechanism or frame 5, on which the needle is mounted. This frame 5 is carried by the two sets of swinging arms 6 and 7, which are pivoted to the bed-piece 8. This bed-piece, and consequently the whole parallel-motion mechanism or other form of hinged frame, is removably mounted on the vaporizing apparatus by means of the spring-hook-shaped projection 9, which slips over the mouth of the mixing-tube 10. The swinging piece 7 may be made solid, as shown, or might be made U-shaped, the lower swinging piece 6, however, being shown in such position that it falls below the vaporizing-tube 2 and must be made U-shaped, as shown in Fig. 6. This piece 6 is pivoted on the foundation-piece 8 by the pin 15, and the piece 7 is similarly pivoted by the pin or shaft 11, which latter is rigidly connected with the piece 7 by means of the short cross-pin 16 (see Figs. 2, 3, and 5) or some other similar device. The parallel-moving piece 5 is also made double to encompass the vaporizing-tube and is composed of the two parallel portions 5 and $5^a$, as shown in Figs. 3 and 6, connected at the bottom, as shown in Fig. 3.

Various means for giving vibrating motion to the swinging frame could be used; but I have shown the pivoted shaft 11 of the piece 7 extended and a reversing-lever 12 mounted thereon. From either end of this reversing-lever pendants in the form of chains or cords 13 14 may be suspended to afford convenient means for moving the lever.

The method of operating my invention is evident from the foregoing. By pulling the pendant 14 until the reversing-lever 12 reaches the limit of its motion (shown in dotted lines in Fig. 4) the frame 5 and needle 4 will be thrust down out of the way of the issuing jet of vapor, the needle keeping the position indicated in dotted lines in Fig. 2. By pulling on the pendant 13 until the lever reaches its extreme limit of motion in the other direction—to wit, the dotted-line horizontal position shown in Fig. 4—the needle 4 will be inserted in the discharge-opening 3 and any impurities collected therein forced back out of the way. By alternately pulling the pendants 13 and 14 several times, so as to move the reversing-lever 12 from the horizontal dotted-line position of Fig. 4 to the full-line position therein shown, the cleaning of the discharge-opening can be thoroughly done. The pendant 14 is then given a final pull, throwing the needle down into the lowermost position, and the lamp can proceed in its operation without being interfered with by the needle.

It is evident, of course, that various changes could be made in the details of the apparatus above described without departing from the spirit and scope of my invention so long as the relative arrangement of the parts shown in the drawings and principle of operation set out in the specification are preserved. Other means than the positive pull by the operator might be employed to move the needle in and out, other means of guiding the needle to and from the opening might be employed, and various modifications be made to adapt the cleaner to different styles of lamp; but all these I consider within the limit of my invention.

Having therefore described my invention, what I claim as new, and desire to protect by Letters Patent, is—

1. In a vapor-burning apparatus the combination with a vaporizing-tube having a discharge-opening, of a hinged frame, a cleaning-needle on said frame so disposed as to come opposite the discharge-opening or to be withdrawn to one side of the line of discharge, and means for vibrating the hinged frame, substantially as described.

2. In a vapor-burning apparatus the combination with a vaporizing-tube having a discharge-opening in its side, of a hinged frame, a cleaning-needle on said frame, so disposed as to come opposite the discharge-opening or to be withdrawn to one side of the line of discharge, and means for vibrating the hinged frame, substantially as described.

3. In a vapor-burning apparatus the combination with a vaporizing-tube having a discharge-opening in its side, of a hinged frame, removably mounted on the vapor-burning apparatus, a cleaning-needle on said frame so disposed as to come opposite the discharge-opening or to be withdrawn to one side of the line of discharge, and means for vibrating the hinged frame, substantially as described.

4. In a vapor-burning apparatus the combination with a vaporizing-tube having a discharge-opening in its side, of a hinged frame, consisting of a parallel-motion mechanism, a cleaning-needle on said frame so disposed as to come opposite the discharge-opening or to be withdrawn to one side of the line of discharge, and means for vibrating the hinged frame, substantially as described.

5. In a vapor-burning apparatus the combination with a vaporizing-tube having a discharge-opening in its side, of a hinged frame consisting of a parallel-motion mechanism, a cleaning-needle on said frame, so disposed as to come opposite the discharge-opening or to be withdrawn to one side of the line of discharge, and a reversing-lever mounted on one of the pivot-shafts of said parallel-motion mechanism substantially as described.

6. In a vapor-burning apparatus the combination with a vaporizing-tube having a discharge-opening in its side, of a hinged frame consisting of a parallel-motion mechanism, a cleaning-needle on said frame, so disposed as to come opposite the discharge-opening or to be withdrawn to one side of the line of discharge, and a reversing-lever mounted on one of the pivot-shafts of said parallel-motion mechanism, together with pendants from the two arms of said lever, substantially as described.

Signed by me at New York, N. Y., this 26th day of November.

ARTHUR KITSON.

Witnesses:
   A. PARKER-SMITH,
   LILIAN FOSTER.